US012551806B2

(12) United States Patent
Jordan et al.

(10) Patent No.: US 12,551,806 B2
(45) Date of Patent: Feb. 17, 2026

(54) RIDE VEHICLE ARTIFICIAL INTELLIGENCE ENTITY SYSTEMS AND METHODS

(71) Applicant: Universal City Studios LLC, Universal City, CA (US)

(72) Inventors: Robert Michael Jordan, Orlando, FL (US); Mark James Traynor, Orlando, FL (US)

(73) Assignee: Universal City Studios LLC, Universal City, CA (US)

( * ) Notice: Subject to any disclaimer, the term of this patent is extended or adjusted under 35 U.S.C. 154(b) by 468 days.

(21) Appl. No.: 18/316,071

(22) Filed: May 11, 2023

(65) Prior Publication Data
US 2023/0364522 A1    Nov. 16, 2023

Related U.S. Application Data

(60) Provisional application No. 63/340,786, filed on May 11, 2022.

(51) Int. Cl.
*A63G 31/00* (2006.01)
(52) U.S. Cl.
CPC ..................... *A63G 31/00* (2013.01)
(58) Field of Classification Search
CPC ......... A63G 31/00; A63G 31/02; A63G 31/16
See application file for complete search history.

(56) References Cited

U.S. PATENT DOCUMENTS

| | | |
|---|---|---|
| 6,796,908 B2 | 9/2004 | Weston |
| 7,955,168 B2 | 6/2011 | Mendelsohn et al. |
| 8,342,929 B2 | 1/2013 | Briggs et al. |
| 9,943,769 B2 | 4/2018 | Comploi |
| 10,322,353 B1 | 6/2019 | Goergen et al. |
| 2009/0234666 A1 | 9/2009 | Crawford et al. |
| 2019/0201806 A1 | 7/2019 | Weston |
| 2019/0318539 A1 | 10/2019 | Weston |
| 2021/0271881 A1 | 9/2021 | Traynor et al. |
| 2021/0311624 A1* | 10/2021 | Hall ..................... G06F 3/04886 |
| 2023/0226458 A1* | 7/2023 | Haynes .................. A63G 33/00 472/131 |
| 2025/0217618 A1* | 7/2025 | Goergen ............... H04L 67/535 |

OTHER PUBLICATIONS

PCT/US2023/021930 International Search Report and Written Opinion mailed Aug. 30, 2023.

* cited by examiner

*Primary Examiner* — Monica L Perry
(74) *Attorney, Agent, or Firm* — Fletcher Yoder P.C.

(57) ABSTRACT

Systems and methods presented herein include one or more guest activity recognition devices configured to recognize activity of one or more guests within a physical environment of an amusement park. The system also includes one or more ride vehicles of a ride of the amusement park, each ride vehicle including an artificial intelligence entity management system configured to maintain one or more ride vehicle artificial intelligence entities of the ride vehicle based at least in part on the recognized activity of the one or more guests; and one or more features disposed on the ride vehicle and configured to be activated by the artificial intelligence entity management system to simulate the existence of the one or more ride vehicle artificial intelligence entities in accordance with one or more properties of the one or more ride vehicle artificial intelligence entities.

20 Claims, 4 Drawing Sheets

RIDE VEHICLE ARTIFICIAL INTELLIGENCE ENTITY SYSTEMS AND METHODS

CROSS-REFERENCE TO RELATED APPLICATION

This application claims priority to and the benefit of U.S. Provisional Application No. 63/340,786, entitled "RIDE VEHICLE ARTIFICIAL INTELLIGENCE ENTITY SYSTEMS AND METHODS," filed May 11, 2022, which is hereby incorporated by reference in its entirety for all purposes.

BACKGROUND

The present disclosure relates generally to the field of amusement parks. More specifically, embodiments of the present disclosure relate to systems and methods for enabling ride vehicle artificial intelligence entities.

This section is intended to introduce the reader to various aspects of art that may be related to various aspects of the present disclosure, which are described below. This discussion is believed to be helpful in providing the reader with background information to facilitate a better understanding of the various aspects of the present disclosure. Accordingly, it should be understood that these statements are to be read in this light, and not as admissions of prior art.

Amusement parks include a variety of features providing unique experiences to each park guest. Some features may include a ride vehicle that may travel along a specific path. The path may include elements such that, as the ride vehicle travels along the path, those elements may enhance a guest's experience. For example, the ride vehicle may enter and exit several rooms when traveling along the path, where there are elements inside of each room to enhance a guest's experience. However, it is now recognized that the ability to simulate more complex (and customized) experiences may further enhance guest experiences.

SUMMARY

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

In certain embodiments, a system includes one or more guest activity recognition devices configured to recognize activity of one or more guests within a physical environment of an amusement park. The system also includes one or more ride vehicles of a ride of the amusement park, each ride vehicle including an artificial intelligence entity management system configured to maintain one or more ride vehicle artificial intelligence entities of the ride vehicle based at least in part on the recognized activity of the one or more guests; and one or more features disposed on the ride vehicle and configured to be activated by the artificial intelligence entity management system to simulate the existence of the one or more ride vehicle artificial intelligence entities in accordance with one or more properties of the one or more ride vehicle artificial intelligence entities.

In addition, in certain embodiments, a method includes recognizing, via one or more guest activity recognition devices, activity of one or more guests within a physical environment of an amusement park. The method also includes maintaining, via an artificial intelligence entity management system of a ride vehicle, one or more ride vehicle artificial intelligence entities of the ride vehicle based at least in part on the recognized activity of the one or more guests. The method further includes activating, via the artificial intelligence entity management system of the ride vehicle, one or more features disposed on the ride vehicle to simulate the existence of the one or more ride vehicle artificial intelligence entities in accordance with one or more properties of the one or more ride vehicle artificial intelligence entities.

In addition, in certain embodiments, a ride vehicle is configured to receive data relating to recognized activity of one or more guests within a physical environment of an amusement park; to maintain one or more ride vehicle artificial intelligence entities of the ride vehicle based at least in part on the data relating to the recognized activity of the one or more guests; and to activate one or more features disposed on the ride vehicle to simulate the existence of the one or more ride vehicle artificial intelligence entities in accordance with one or more properties of the one or more ride vehicle artificial intelligence entities.

BRIEF DESCRIPTION OF THE DRAWINGS

These and other features, aspects, and advantages of the present disclosure will become better understood when the following detailed description is read with reference to the accompanying drawings in which like characters represent like parts throughout the drawings, wherein.

DETAILED DESCRIPTION

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

Embodiments of the present disclosure are directed to systems and methods for managing ride vehicle artificial intelligence (AI) entities, which may have particular identities, character details, personality traits, moods, preferences, and so forth, which may be modified based on activity of guests (e.g., directly associated with the AI entities) within an amusement park, which may be monitored by various park sensors. Each AI entity may be specific to a particular ride vehicle. Indeed, in certain embodiments, a ride vehicle AI entity system may reside on a particular ride vehicle that manifests an AI entity that is specific to the particular ride vehicle. In certain embodiments, one or more features associated with the particular ride vehicle may be activated by the ride vehicle AI entity system of the particular ride vehicle to manifest the existence of the AI entity that is specific to the particular ride vehicle.

Figure 1:
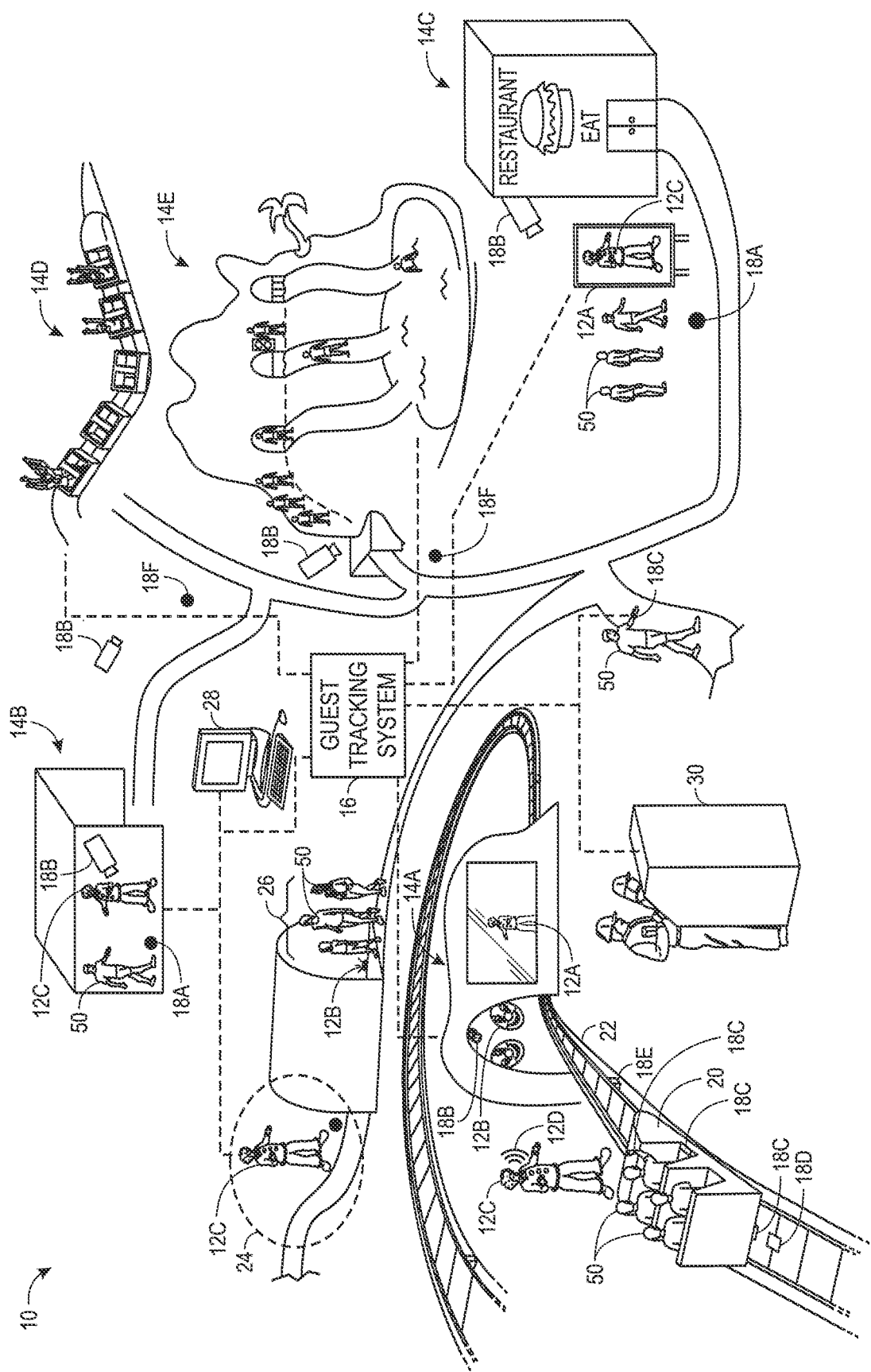
FIG. 1 is a schematic representation of an amusement park with ride vehicle artificial intelligence (AI) entities, in accordance with an embodiment of the present disclosure.

Turning to the drawings, FIG. 1 is a schematic representation of an amusement park 10 with ride vehicle AI entities. In certain embodiments, the amusement park 10 includes one or more features 12 (e.g., a display 12A, a lighting effect system 12B, an animated figure 12C, and/or a sound effect system 12D) that may be modified for a particular guest 50, on or around various attractions, zones, pathways, or other areas of the amusement park 10. The one or more features 12 illustrated in FIG. 1 may be disposed in various locations throughout the amusement park 10. However, as described in greater detail herein, one or more features 12 may reside on a particular ride vehicle 20 and may collectively function as a ride vehicle AI manifestation system configured to manifest the existence of AI entities that are specific to certain ride vehicles 20 of the amusement park 10. In addition, as also described in greater detail herein, the ride vehicle AI entity manifested by the one or more features 12 of the particular ride vehicle 20 may also be specific to a particular guest 50 riding the particular ride vehicle 20.

In the illustrated embodiment, the amusement park 10 also includes multiple attractions 14 including tunnel ride attractions 14A, virtual game room attractions 14B, restaurant attractions 14C, roller coaster attractions 14D, and water attractions 14E, among other attractions. As described in greater detail herein, different embodiments of the features 12 may be found throughout the amusement park 10, and may be activated to react in a manner that the guests 50 perceive as a response from an AI entity based at least in part on guest data collected by various park sensors 18 disposed about the amusement park 10, which is collected by a guest tracking system 16.

For example, in certain embodiments, a tunnel ride attraction 14A may include displays 12A that display images of an animated figure 12C. In response to detecting a particular guest 50, such as detecting the particular guest 50 using proximity sensors 18A to detect a human presence and the cameras 18B to identify the particular guest 50, a particular animated figure 12C may be displayed to react based at least in part on guest data collected for the particular guest 50, as described in greater detail herein. Moreover, in certain embodiments, a virtual embodiment or hologram of the animated figure 12C in a virtual game in a virtual game room 14B may react similarly.

As another non-limiting example, in certain embodiments, a particular guest 50 may be determined to currently be on a tunnel ride attraction 14A, for example, based on sensor data from a guest-wearable radio frequency identification (RFID) tag 18C associated with the particular guest 50. As illustrated, in certain embodiments, a ride vehicle 20 of a tunnel ride attraction 14A may also include one or more RFID tags 18C. In certain embodiments, as the ride vehicle 20 moves along ride tracks 22, an electronic reader 18D on the ride track 22 may read the RFID tags 18C of the ride vehicle 20, indicating presence of the ride vehicle 20. Based on the ride vehicle 20 being present and moving along the ride tracks 22, the guest tracking system 16 may determine that a particular guest 50 is present within a threshold distance of interest, such as within a distance near one or more features 12 that may be activated to simulate the existence of an AI entity associated with the particular guest 50, as described in greater detail herein. Additionally or alternatively, a weight sensor 18E positioned on the ride track 22 may detect a weight above a threshold weight when the ride vehicle 20 moves over the weight sensor 18E, indicating presence of the ride vehicle 20.

In certain embodiments, after determining that the ride vehicle 20 is present and a particular guest 50 is likely present, additional park sensors 18, such as a camera 18B and/or the guest-wearable RFID tag 18C, may trigger the additional park sensors 18 to collect data (to assist in identifying the particular guest 50). For example, in certain embodiments, the guest tracking system 16 may perform an image analysis of video and/or images collected by the camera 18B to match the image to one corresponding to a user ID associated with the particular guest 50. Additionally or alternatively to the camera 18B, the guest tracking system 16 may analyze RFID tag data to associate it with user ID associated with the particular guest 50. In certain embodiments, the guest tracking system 16 may determine the presence of and identify the particular guest 50 using the camera 18B and/or the RFID tag 18C rather than initially determining the presence of the particular guest 50, for example, based on the weight of the ride vehicle 20.

After identifying the guest 50, the guest tracking system 16 may determine guest data for the particular guest 50, and subsequently modify interactions of the tunnel ride attraction 14A based on the guest data. For example, in certain embodiments, the guest data may indicate that the particular guest 50 fears clowns. In particular, the guest tracking system 16 may determine that the particular guest 50 made a statement (e.g., captured by an audio sensor 18F at another attraction 14) that he is afraid of clowns. As such, certain features 12 may be activated accordingly. For example, in the present example, a particular park animated feature 12C may call out to the particular guest 50, ask about a game that the particular guest 50 played earlier at the amusement park 10, ask about a family member by name, make comments related to amusement park zones that the guest 50 visited, and so forth (e.g., via an associated sound effect system 12D) as the ride vehicle 20 the particular guest 50 is riding approaches the animated feature 12C. Thus, features 12 disposed about the amusement park 10 may be activated based on the guest data determined by the park sensors 18 disposed about the amusement park 10. In addition, in certain embodiments, an animated figure 12C may be animated, for example, to make faces or gestures that scare the particular guest 50 based on the guest data.

In addition, as described in greater detail herein, an AI entity management system disposed on a ride vehicle 20 may be configured to retrieve the guest data collected by the guest tracking system 16 and to activate certain features 12 (e.g., a display 12A, a lighting effect system 12B, an animated figure 12C, and/or a sound effect system 12D) of the ride vehicle 20 to simulate the existence of an AI entity related to the ride vehicle 20. By way of example, the guest data (e.g., number of tickets purchased for the amusement park 10) may indicate that a particular guest 50 is visiting the amusement park 10 with two other family members and, thus, the AI entity management system of a particular ride vehicle 20 may access data related to the two other family members (e.g., family member names tagged on a social media application, for example) when the particular guest 50 is riding the particular ride vehicle 20. In addition, in certain embodiments, during a ride on the tunnel ride attraction 14A, the guest tracking system 16 may analyze video data from the camera 18B that indicates that the particular guest 50 is on the particular ride vehicle 20 with other guests 50, may determine that the other guests 50 are the family members, and may send this data to the AI entity management system of the particular ride vehicle 20. In certain embodiments, the guest tracking system 16 may perform additional image analysis to match captured video data to images on a social media application to confirm identity of the other guests 50, and may send this data to the AI entity management system of the particular ride vehicle 20. Thus, the AI entity management system of the particular ride vehicle 20 may use this data to address the other guests 50 by their respective names, providing a customized interaction for the particular guest 50 and/or the related guests 50. However, in certain embodiments, the particular guest 50 may control the data shared with the guest management system 16 and the AI entity management system of the particular ride vehicle 20, and as such, the extent of interactivity may correspond to the extent of data shared. For example, the limitations may cause the AI entity management system of the particular ride vehicle 20 to limit the interactions to addressing only the guest 50 by name and not the other family members.

In certain embodiments, a ride vehicle 20 may include other sound effect systems 12D that the AI entity management system of the ride vehicle 20 modifies based on the guest data. For example, in certain embodiments, the AI entity management system of a ride vehicle 20 may cause the sound effect system 12D to play audio associated with the particular guest's favorite attraction 14 (e.g., theme song). In addition, in certain embodiments, the AI entity management system of a ride vehicle 20 may cause a lighting effect system 12B to project clown faces in the tunnel of the tunnel ride attraction 14A based on the guest data for the particular guest 50. In addition, in certain embodiments, the AI entity management system of a ride vehicle 20 may activate other features 12 of the particular ride vehicle 20 based on presence of the particular guest 50. For example, in certain embodiments, the AI entity management system of a ride vehicle 20 may activate features 12 on the left side of the tunnel ride attraction 14A for a particular guest 50 positioned on the left side of the ride vehicle 20 while activating features 12 on the right side of the tunnel ride attraction 14A for a particular guest 50 positioned on the right side of the ride vehicle 20.

In addition, in certain embodiments, the AI entity management system of a ride vehicle 20 may activate an animated figure 12C of the ride vehicle 20 when an identified guest 50 is in the ride vehicle 20. In certain embodiments, the guest tracking system 16 may track the presence of certain groups 26 of guests 50 and a combination of preferences of individuals in the group 26. For example, in certain embodiments, an overlap of interest between a majority of group members may be identified and used to provide interactions, random selections or combinations of interactions may be selected based on preferences of those in the group, interactions may be cycled through based on group preferences, and so forth.

In addition, in certain embodiments, a monitoring system 28 and/or a service desk 30 may monitor activity of the guests 50 in the amusement park 10 to ensure that the park operations are completed as expected. In particular, as described in greater detail herein, the interactions with particular guests 50 that are activated via the various features 12 described herein are intended to simulate the existence of one or more AI entities, and which develop particular "personality traits" based, for example, previous activity of particular guests 50 within the amusement park 10, for example, as detected by the various park sensors 18 described herein.

Figure 2:
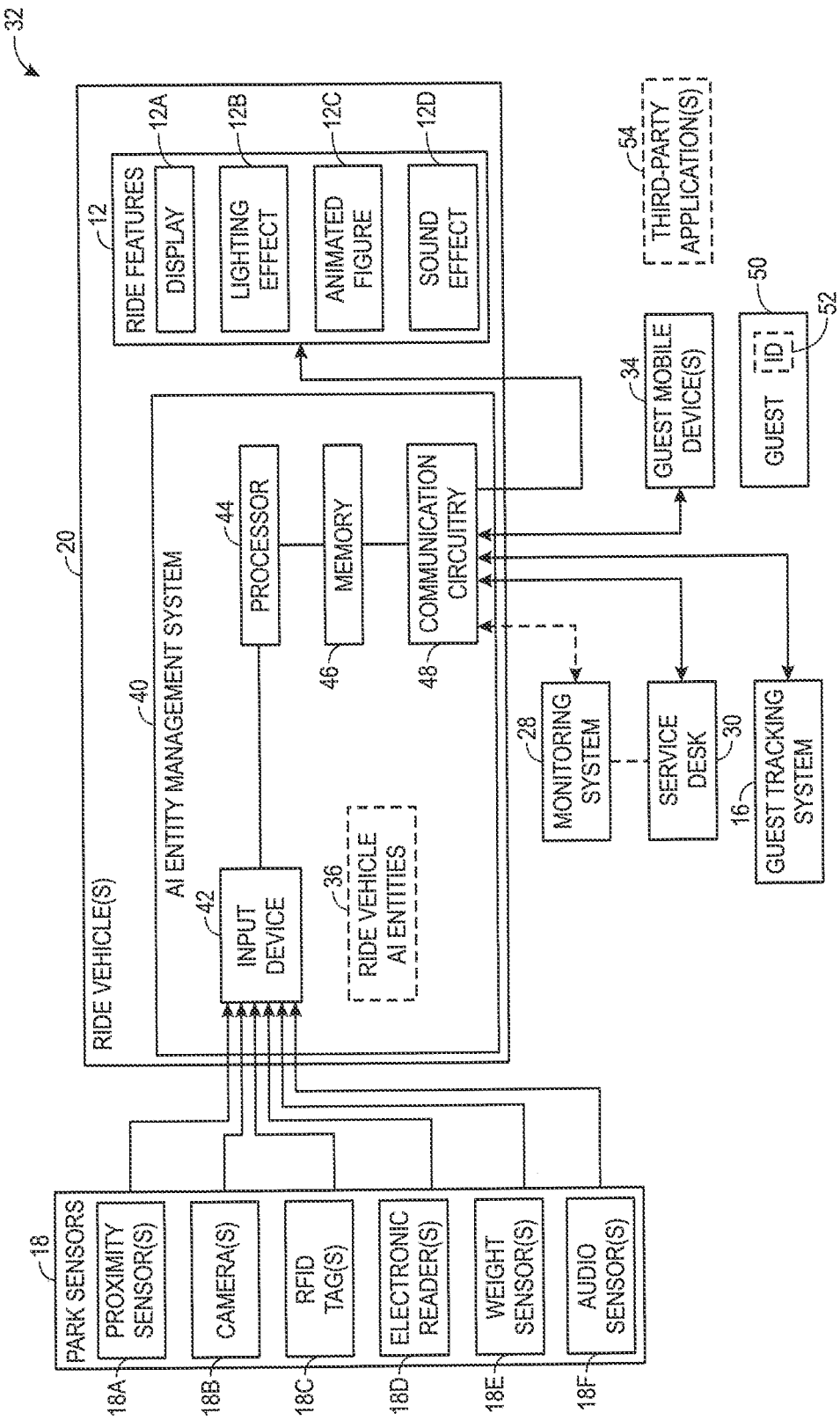
FIG. 2 depicts a ride vehicle AI entity system for activating features of the amusement park of FIG. 1 to simulate the existence of ride vehicle AI entities, in accordance with an embodiment of the present disclosure.

To illustrate how the ride vehicles 20 maintain their respective ride vehicle AI entities 36 described herein, FIG. 2 depicts a ride vehicle AI entity system 32 for activating features 12 of the amusement park 10 of FIG. 1 to simulate the existence of ride vehicle AI entities 36. As illustrated, the ride vehicle AI entity system 32 includes park sensors 18, the guest tracking system 16, one or more ride vehicles 20 having one or more features 12 and an AI entity management system 40, and one or more guest mobile devices 34, among other devices. It should be understood that the illustrated system is merely intended to be exemplary, and that certain features and components may be omitted and various other features and components may be added to facilitate performance, in accordance with the disclosed embodiments.

As illustrated, in certain embodiments, the AI entity management system 40 of each ride vehicle 20 may include an input device 42, a processor 44, a memory 46, and communication circuitry 48. In certain embodiments, the input device 42 may receive input data from the park sensors 18. For example, in certain embodiments, the AI entity management system 40 of the ride vehicle 20 may receive input data from the park sensors 18 via the input device 42 at certain locations along the ride track of its respective ride where the input device 42 can interface with physical data interfaces. However, in other embodiments, the input device 42 may be configured to wirelessly receive the input data from the park sensors 18. Based on the input data received at the input device 42, the AI entity management system 40 of the ride vehicle 20 may manage ride vehicle AI entities 36 of the respective ride vehicle 20 by, for example, modifying artificial personalities of the ride vehicle AI entities 36, activating various features 12 to manifest the existence of the ride vehicle AI entities 36, and so forth.

In particular, in the amusement park setting described herein (and illustrated in FIG. 1), the AI entity management system 40 of a ride vehicle 20 may control features 12 of the ride vehicle 20 such as displays 12A, lighting effect systems 12B, animated figures 12C, and/or sound effect systems 12D. By way of example, a tunnel ride attraction 14A or a roller coaster attraction 14D may include one or more displays 12A, a lighting effect system 12B, one or more animated figures 12C, and/or a sound effect system 12D. As described in greater detail herein, the AI entity management system 40 of the ride vehicle 20 may control its respective features 12 to provide customized interactions for the guest 50. By way of example, the AI entity management system 40 of the ride vehicle 20 may control a speaker of a sound effect system 12D on the ride vehicle 20 to produce audio associated with a ride vehicle AI entity 36 associated with a particular guest 50. For example, the audio may include recognizable and unique sounds (e.g., a song associated with a particular AI entity 36) and/or the guest's name. The customized audio may be based on guest data acquired by the park sensors 18 described herein.

As another example, the AI entity management system 40 of a ride vehicle 20 may control a lighting effect system 12B of the ride vehicle 20 to project specific animations during a ride based on the guest data. For example, the AI entity management system 40 of the ride vehicle 20 may retrieve guest data from the park sensors 18 that indicates the particular guest's fears, and use this guest data to modify animations projected by the lighting effect system 12B (e.g., project spiders if the particular guest 50 is afraid of spiders and the associated AI entity 36 is associated with spiders in some way). In this manner, the AI entity management system 40 of the ride vehicle 20 may control and modify ride interactions to provide a customized experience based on the guest data. In certain embodiments, the AI entity management system 40 of the ride vehicle 20 may also detect the presence (e.g., identification, location, movement, and so forth) of a particular guest 50 in the ride vehicle 20, as described in greater detail herein.

As described above with respect to FIG. 1, the park sensors 18 may include one or more proximity sensors 18A, one or more cameras 18B, one or more radio frequency identification (RFID) tags 18C, one or more electronic readers 18D, one or more weight sensors 18E, and/or one or more audio sensors 18F. The park sensors 18 may be placed or positioned in areas where guest presence is expected, such as on a ride vehicle 20 or a ride track 22 of a ride. In certain embodiments, the RFID tags 18C may communicate with the electronic readers 18D to indicate a presence of a particular guest 50. For example, in certain embodiments, the RFID tags 18C may be incorporated on a ride, such as on a ride track 22 or a ride vehicle 20 of the ride (e.g., inside, on the side, or on the entryway of the ride vehicle 20). In addition, the electronic readers 18D may be placed in a manner that allows scanning of the RFID tag 18C. By way of example, an electronic reader 18D may be placed on the ride track 22 such that the electronic reader 18D may scan the RFID tag 18C on the ride vehicle 20 as the ride vehicle 20 passes over the electronic reader 18D, indicating that the particular guest 50 is on the ride. In certain embodiments, the RFID tags 18C may include guest-wearable RFID tags 18C that are associated with particular user IDs 52. Thus, the input data from an electronic reader 18D may indicate that a particular guest 50 associated with a particular user ID 52 is present upon scanning the guest-wearable RFID tag 18C associated with the particular guest 50. Subsequently, the AI entity management system 40 of the ride vehicle 20 may retrieve the guest data based on the user ID 52 and activate the features 12 of its respective ride vehicle 20 accordingly, as described in greater detail herein.

As described in greater detail herein, the amusement park 10 may also track guest park activity, such as ride history, interactions, and so forth. By way of example, the tracked guest park activity (e.g., tracked via a guest-wearable RFID tag 18C) may indicate that a particular guest 50 stayed in a specific zone of the amusement park 10 for the majority of the guest's visit to the amusement park 10. The tracked guest park activity may also indicate that the particular guest 50 rode a particular ride more often than other rides. Based on this guest data, the AI entity management system 40 of the ride vehicle 20 may determine preferences for the particular guest 50 (e.g., favorite zone and ride at the amusement park 10) and use these preferences to modify the artificial personality of a ride vehicle AI entity 36 associated with the particular guest 50, as described in greater detail herein.

In certain embodiments, cameras 18B may be placed or positioned in areas based on where guest presence is expected, such as to view a ride vehicle 20 on a ride. In such embodiments, the cameras 18B may determine the presence of a particular guest 50 based on images and/or video captured by the cameras 18B. Specifically, the cameras 18B may perform facial recognition and/or body recognition to determine the presence of a particular guest 50. In certain embodiments, the cameras 18B may instead provide the images and/or video as input data to the AI entity management system 40 of a ride vehicle 20, which may subsequently perform the facial recognition and/or body recognition. For example, in certain embodiments, the cameras 18B and/or the AI entity management system 40 of the ride vehicle 20 may match the images and/or video to a previously-stored image of the particular guest 50. In certain embodiments, the previously-stored image of the particular guest 50 may be one that is stored in the memory 46 of the AI entity management system 40 of the ride vehicle 20 and associated with the user ID 52 of the particular guest 50 and/or retrievable through third party applications 54 (e.g., a guest profile picture on a social media application).

Additionally or alternatively, in certain embodiments, the weight sensors 18E may indicate the presence of a guest 50. For example, the weight sensors 18E may be mounted on ride tracks 22 and may indicate presence of a ride vehicle 20 on the ride tracks 22 based on a predetermined weight. Similarly, in certain embodiments, the proximity sensors 18A may be placed or positioned proximate to areas where guest presence is expected (e.g., in a seat of a ride vehicle 20). The proximity sensors 18A may detect a presence of nearby objects without physical contact by using electromagnetic fields, light, and/or sound. The proximity sensors 18A may emit an electromagnetic field or a beam of electromagnetic radiation (e.g., infrared) and look for changes in the field or return signal. To accurately detect the presence of the nearby object as a guest 50, the proximity sensors 18A may be positioned near a loading point for a ride vehicle 20 and/or on a ride vehicle seat. In certain embodiments, the RFID tags 18C and/or the cameras 18B may be used alone or in conjunction with other park sensors 18 (e.g., weight sensors 18E and/or proximity sensors 18A) to detect the presence of a particular guest 50 and/or to identify a particular guest 50.

Additionally or alternatively, in certain embodiments, third party applications 54 may provide input data to the AI entity management system 40 of a ride vehicle 20. That is, upon guest permission, the third party applications 54 may be enabled to share data with the AI entity management system 40 of a particular ride vehicle 20. The third party applications 54 may include systems associated with third parties, which include entities that do not have a direct relationship with the amusement park 10. The third party applications 54 may provide third party data from one or more third parties, collected through their websites, mobile applications, and/or other platforms. The third party applications 54 may include, but are not limited to, social media applications, medical applications, and/or bank applications. As such, the third party data from the third party applications 54 may include data associated with the social media applications, medical applications, and/or bank applications.

In certain embodiments, the guest mobile devices 34 may also provide input data to the AI entity management system 40 of a ride vehicle 20. For example, upon permission received from the guest 50, an associated guest mobile device 34 may be enabled to share device data with the AI entity management system 40 of a particular ride vehicle 20.

The device data may include, but is not limited to, images and/or video stored on or accessible to the guest mobile device 34, a GPS location of the guest mobile device 34, tracking data determined by the guest mobile device 34 (e.g., steps taken per day, average screen time, etc.), and/or setting preferences (e.g., larger text, color theme, special accessibility features enabled, etc.).

As described above with respect to FIG. 1, in certain embodiments, the ride vehicle AI entity system 32 may include a monitoring system 28 and/or a service desk 30. Although the following discussions describe the monitoring system 28 and the service desk 30 as separate components of the ride vehicle AI entity system 32, these components may communicate with each other (e.g., as indicated by the dashed line) or be integrated into a single system (e.g., where the service desk 30 is part of the monitoring system 28). The monitoring system 28 may be an administrative system that monitors the park sensors 18 and the ride vehicles 20 described herein. For example, the monitoring system 28 may monitor control signals sent from the AI entity management systems 40 of the ride vehicles 20 in response to the presence and identification of particular guests 50, as described in greater detail herein. In particular, the monitoring system 28 may ensure that the park sensors 18 and the ride vehicles 20 function as expected and/or provide the customized interactions via ride vehicle AI entities 36 as expected for particular guests 50.

Additionally, in certain embodiments, if the AI entity management system 40 of a ride vehicle 20 is not functioning as expected (e.g., generating erroneous control signals), the monitoring system 28 may control or reconfigure the AI entity management system 40 of the ride vehicle 20. For example, the monitoring system 28 may reset or recalibrate certain park sensors 18 and/or features 12 of the ride vehicle 20 and/or override control signals for the features 12 (e.g., as originally determined by the AI entity management system 40 of the ride vehicle 20). In certain embodiments, the monitoring system 28 and the AI entity management system 40 of the ride vehicle 20 may be implemented as a single controller.

In certain embodiments, the service desk 30, which may include human or virtual service agents, may manually stop the activation of ride vehicle AI entities 36 via a stopping mechanism (e.g., button) to override control signals from the AI entity management system 40 of a ride vehicle 20 if the service desk 30 finds any issues with the ride vehicle AI entities 36 beyond those determined by the AI entity management system 40 of the ride vehicle 20. Since guests 50 may be tracked, as described herein (e.g., via guest-wearable RFID tags 18C, for example), the service desk 30 may monitor activity of the guests 50 and use this information to address unexpected delays or unexpected functions at the amusement park 10. By way of example, the tracked activity may indicate that a guest 50 has attempted to ride a particular roller coaster but was stationary or approximately stationary at the roller coaster zone for a particular duration beyond a threshold duration, indicating an unexpected delay or queues and/or unexpected performance by the roller coaster. In certain embodiments, the unexpected activity may alert the service desk 30 to resolve such issues.

The communication circuitry 48 of the AI entity management system 40 of a ride vehicle 20 may enable the AI entity management system 40 of the ride vehicle 20 to interface with various electronic devices, such as the monitoring system 28, the service desk 30, the features 12 of the ride vehicle 20, and/or the guest mobile devices 34. For example, in certain embodiments, the monitoring system 28 and/or the service desk 30 may communicate with the AI entity management system 40 of the ride vehicle 20 to receive and/or send information (as indicated by double-headed arrow) to ensure that the AI entity management system 40 of the ride vehicle 20 and/or the features 12 of the ride vehicle 20 are operating as expected. In addition, in certain embodiments, the communication circuitry 48 may enable the AI entity management system 40 of the ride vehicle 20 to interface with components of the features 12 of the ride vehicle 12. For example, the communication circuitry 48 may enable the AI entity management system 40 of the ride vehicle 20 to communicatively couple to a network, such as a personal area network (PAN), a local area network (LAN), and/or a wide area network (WAN).

Accordingly, in certain embodiments, the AI entity management system 40 of the ride vehicle 20 may process data received from the park sensors 18 via the input device 42, determine presence of and identify particular guests 50, determine guest data associated with the particular guests 50 from the respective user IDs 52, determine modifications to ride vehicle AI entities 36 (e.g., modifications to personalities of the ride vehicle AI entities 36, among other modifications), determine modifications to interactions via certain features 12 of the ride vehicle 20 (e.g., activation of functions of the features 12) to facilitate customized experiences for the guests 50 (e.g., via simulation of the existence of the ride vehicle AI entities 36), and communicate the modifications to the features 12. For example, after processing sensor data received via the input device 42, the processor 44 of the AI entity management system 40 of the ride vehicle 20 may determine a control signal that enables the communication circuitry 48 to transmit control data to the features 12 of the ride vehicle 20 to enable activation of the modifications via the features 12 of the ride vehicle 20.

In addition, in certain embodiments, the AI entity management system 40 may be configured to utilize relatively efficient processing by using machine learning to identify what data even needs to be received from and/or transmitted to the park sensors 18, the guest tracking system 16, the monitoring system 28, the service desk 30, the guest mobile devices 34, cloud storage, and so forth, to provide a desired ride output via the features 12 of the ride vehicle 20. In particular, in certain embodiments, the AI entity management system 40 may only request certain types of data from the park sensors 18, the guest tracking system 16, the monitoring system 28, the service desk 30, the guest mobile devices 34, cloud storage, and so forth, when that particular type of data is needed (and not already stored locally) to perform certain functions relating to the ride vehicle AI entities 36. In addition, in certain embodiments, the AI entity management system 40 may only transmit certain type of data to the guest tracking system 16, the monitoring system 28, the service desk 30, the guest mobile devices 34, cloud storage, and so forth, when that particular type of data is either requested or when the AI entity management system 40 determines that the particular type of data is likely to be needed for performance of other functions relating to the ride vehicle AI entities 36 described herein.

The processor 44 of the AI entity management system 40 of a ride vehicle 20 may include one or more processing devices that receive input signals from the input device 42 relating to the presence and/or identification of guests 50, which may then be used to determine modifications to interactions via certain features 12 of the ride vehicle 20 (e.g., activation of functions of the features 12 of the ride vehicle 20) to facilitate customized experiences for the guests 50 (e.g., via simulation of the existence of the ride vehicle AI entities 36), using techniques described herein. The memory 46 of the AI entity management system 40 of the ride vehicle 20 may include one or more tangible, non-transitory, machine-readable media. By way of example, such machine-readable media can include RAM, ROM, EPROM, EEPROM, or optical disk storage, magnetic disk storage or other magnetic storage devices, or any other medium which can be used to carry or store desired algorithms (e.g., program code) in the form of machine-executable instructions or data structures and which can be accessed by the processor 44 of the AI entity management system 40 of the ride vehicle 20 or by other processor-based devices. The processor 44 of the AI entity management system 40 of the ride vehicle 20 may include a processing core to execute machine-executable instruction algorithms stored in the memory 46 of the AI entity management system 40 of the ride vehicle 20. The processor 44 of the AI entity management system 40 of the ride vehicle 20 may also include processor-side interfaces for software applications running on the processing core to interact with hardware components such as the features 12 of the ride vehicle 20 described herein. In certain embodiments, the memory 46 of the AI entity management system 40 of the ride vehicle 20 may store guest data corresponding to tracked guest activity and park activity, and corresponding preferences of the guests 50 (e.g., by manual input from the guests 50 and/or as determined by processing an algorithm executed by the processor 44 of the AI entity management system 40 of the ride vehicle 20). In certain embodiments, the memory 46 of the AI entity management system 40 of the ride vehicle 20 may tag the guest data with the corresponding user IDs 52 prior to storing it for subsequent retrieval. That is, in certain embodiments, the AI entity management system 40 of the ride vehicle 20 may retrieve data associated with the guest 50 by looking up an ID 52 and using the associated guest data.

By way of example, in the amusement park setting described herein (and illustrated in FIG. 1), the stored algorithms may include, but are not limited to, algorithms to determine the guest presence based on sensor data from the park sensors 18, identify particular guests 50 (e.g., by processing sensor data from cameras 18B and performing facial recognition and/or processing sensor data from RFID tags 18C that are associated with user IDs 52 for the guests 50), retrieve guest data for the user IDs 52, determine modifications to interactions within the amusement park 10 based on the guest data, and provide a modified image, sound, lighting effect, or animation (e.g., stored in the memory 46) based on the guest data (e.g., indicating preferences or guest information that modifies one or more ride vehicle AI entities 36). In this manner, the AI entity management system 40 of a ride vehicle 20 may determine the presence of a particular guest 50 and control features 12 of the ride vehicle 20 accordingly.

Figure 3:
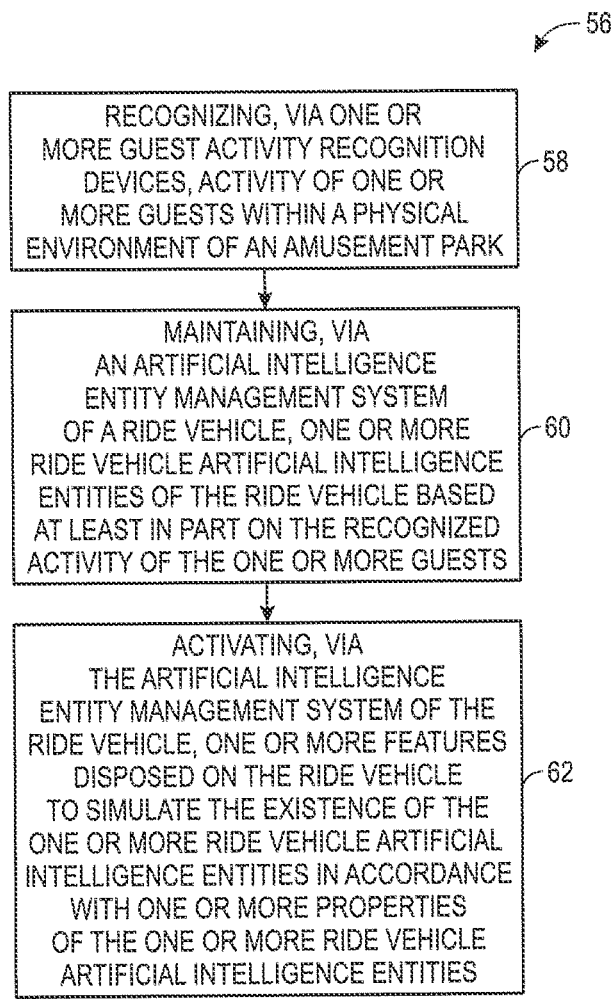
FIG. 3 is a flow diagram of a method of operating the ride vehicle AI entity system of FIG. 2, in accordance with an embodiment of the present disclosure.

As such, as described in greater detail herein, the ride vehicle AI entity system 32 illustrated in FIG. 2 is configured to manage ride vehicle AI entities 36 that are associated with particular ride vehicles 20 of the amusement park 10 illustrated in FIG. 1. FIG. 3 is a flow diagram of a method 56 of operating the ride vehicle AI entity system 32 of FIG. 2. As illustrated, in certain embodiments, the method 56 includes recognizing, via one or more guest activity recognition devices (e.g., the park sensors 18 described herein), activity of one or more guests 50 within a physical environment of an amusement park 10 (block 58). In addition, in certain embodiments, the method 56 also includes maintaining, via an AI entity management system 40 of a ride vehicle 20, one or more ride vehicle AI entities 36 of the ride vehicle 20 based at least in part on the recognized activity of the one or more guests 50 (block 60). In addition, in certain embodiments, the method 56 further includes activating, via the AI entity management system 40 of the ride vehicle 20, one or more features 12 disposed on the ride vehicle 20 to simulate the existence of the one or more ride vehicle AI entities 36 in accordance with one or more properties of the one or more ride vehicle AI entities 36 (block 62). As described in greater detail herein, in certain embodiments, each ride vehicle AI entity 36 of the one or more ride vehicle AI entities 36 is specific to the ride vehicle 20. However, in other embodiments, each ride vehicle AI entity 36 of the one or more ride vehicle AI entities 36 is specific to a guest 50 or group 26 of guests 50 of the one or more guests 50.

As described in greater detail herein, in certain embodiments, the one or more guest activity recognition devices that are used to collect data that is used to recognize activity of the one or more guests 50 may include one or more proximity sensors 18A configured to detect the presence of a guest 50 of the one or more guests 50 at a location within the physical environment of the amusement park 10. In addition, in certain embodiments, the one or more guest activity recognition devices that are used to collect data that is used to recognize activity of the one or more guests 50 may include one or more cameras 18B configured to detect the presence of a guest 50 of the one or more guests 50 at a location within the physical environment of the amusement park 10, to determine an identity of the guest 50 of the one or more guests 50, or some combination thereof. In addition, in certain embodiments, the one or more guest activity recognition devices that are used to collect data that is used to recognize activity of the one or more guests 50 may include one or more electronic readers 18D configured to detect the presence of one or more radio frequency identification tags 18C associated with the one or more guests 50 at locations within the physical environment of the amusement park 10. As described in greater detail herein, in certain embodiments, the one or more radio frequency identification tags 18C may be integrated into a wearable device configured to be worn by the one or more guests 50. In addition, in certain embodiments, the one or more guest activity recognition devices that are used to collect data that is used to recognize activity of the one or more guests 50 may include a weight sensor 18E configured to detect the presence of a guest 50 of the one or more guests 50 at a location within the physical environment of the amusement park 10. In addition, in certain embodiments, the one or more guest activity recognition devices that are used to collect data that is used to recognize activity of the one or more guests 50 may include one or more audio sensors 18F configured to detect sounds generated by a guest 50 of the one or more guests 50.

In addition, in certain embodiments, the one or more features 12 of a ride vehicle 20 that may be activated by the AI entity management system 40 of the ride vehicle 20 may include one or more displays 12A configured to display a ride vehicle AI entity 36 of the one or more ride vehicle AI entities 36. In addition, in certain embodiments, the one or more features 12 of a ride vehicle 20 that may be activated by the AI entity management system 40 of the ride vehicle 20 may include a lighting effect system 12B configured to generate light associated with a ride vehicle AI entity 36 of the one or more ride vehicle AI entities 36. In addition, in certain embodiments, the one or more features 12 of a ride vehicle 20 that may be activated by the AI entity management system 40 of the ride vehicle 20 may include one or more animated figures 12C configured to simulate the existence of a ride vehicle AI entity 36 of the one or more ride vehicle AI entities 36. In addition, in certain embodiments, the one or more features 12 of a ride vehicle 20 that may be activated by the AI entity management system 40 of the ride vehicle 20 may include a sound effect system 12D configured to generate sound associated with a ride vehicle AI entity 36 of the one or more ride vehicle AI entities 36.

Figure 4:
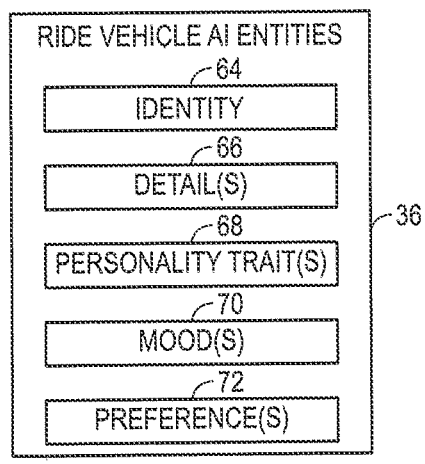
FIG. 4 illustrates various properties of ride vehicle AI entities, which may be managed by the ride vehicle AI entity system of FIG. 2, in accordance with an embodiment of the present disclosure.

As illustrated in FIG. 4, in certain embodiments, the one or more properties of the one or more ride vehicle AI entities 36 may include an identity 64 of the one or more ride vehicle AI entities 36, one or more details 66 about the one or more ride vehicle AI entities 36, one or more personality traits 68 of the one or more ride vehicle AI entities 36, a mood 70 of the one or more ride vehicle AI entities 36, one or more preferences 72 of the one or more ride vehicle AI entities 36, or some combination thereof. For example, an identity 64 of a particular ride vehicle AI entity 36 may be a specific, relatively well-known themed character, for example, for a specific themed zone of the amusement park 10. In certain embodiments, a guest 50 may select a particular character that they would like to have follow them throughout their visit to the amusement park 10 (or to the specific themed zone of the amusement park 10) as a ride vehicle AI entity 36, or a particular character may be automatically selected by the AI entity management system 40 of the ride vehicle 20 to be a ride vehicle AI entity 36 for a particular guest 50, for example, based on tracked activity of the guest 50 (e.g., the guest 50 showing a particular affinity for the particular character, the guest 50 showing a fear of the particular character, and so forth). It will be appreciated that specific themed characters may have details 66 (e.g., backstory details, place of origin, faction alliances, friends, foes, goals, motivations, and so forth) that are specific to the themed characters. In addition, a particular ride vehicle AI entity 36, regardless of whether it is a specific, relatively well-known themed character or an entirely customized character, may have particular personality traits 68, such as happiness, sadness, humor, blandness, bravery, cowardice, passivity, aggressiveness, belligerence, submissiveness, meanness, kindness, sarcasm, respectfulness, and so forth. In addition, a particular ride vehicle AI entity 36 may have particular moods 70 that are substantially similar to the personality traits 68, but which are more temporary in nature, as opposed to the more permanent personality traits 68. In addition, a particular ride vehicle AI entity 36 may have particular preferences 72, such as activities in which they like to participate, areas of the amusement park 10 that they prefer, other themed characters that they have an affinity for (or aversion to), and so forth.

As described in greater detail herein, in certain embodiments, at least some of the ride vehicle AI entities 36 may be specific to the ride vehicle 20. For example, in such embodiments, the ride vehicle AI entities 36 may have persistence (or at least semi-persistence) on the respective ride vehicle 20 where they are permanently maintained (e.g., permanently stored in the memory 46 of the respective AI entity management system 40) or at least semi-permanently maintained (e.g., stored in the memory 46 of the respective AI entity management system 40 for a period of time) by the respective AI entity management system 40 of the ride vehicle 20. Such ride vehicle-specific AI entities 36 may begin to develop a reputation of guests 50 such that the guests 50 may wish to ride a particular ride vehicle 20 so that they can interact with those specific AI entities 36.

However, in other embodiments, at least some of the ride vehicle AI entities 36 may be specific to a guest 50 or group 26 of guests 50. For example, in such embodiments, the ride vehicle AI entities 36 may seem to follow the respective guest 50 or group 26 of guests 50 (e.g., such as a ghost) as they ride various ride vehicles 20. However, in addition, in certain embodiments, at least some of the ride vehicle AI entities 36 may be specific to a guest 50 or group 26 of guests 50 only for a specific ride vehicle 20. For example, in such embodiments, a guest 50 or group 26 of guests 50 may select a particular ride vehicle AI entity 36 with which they would like to interact while they ride a particular ride vehicle 20.

Figure 5:
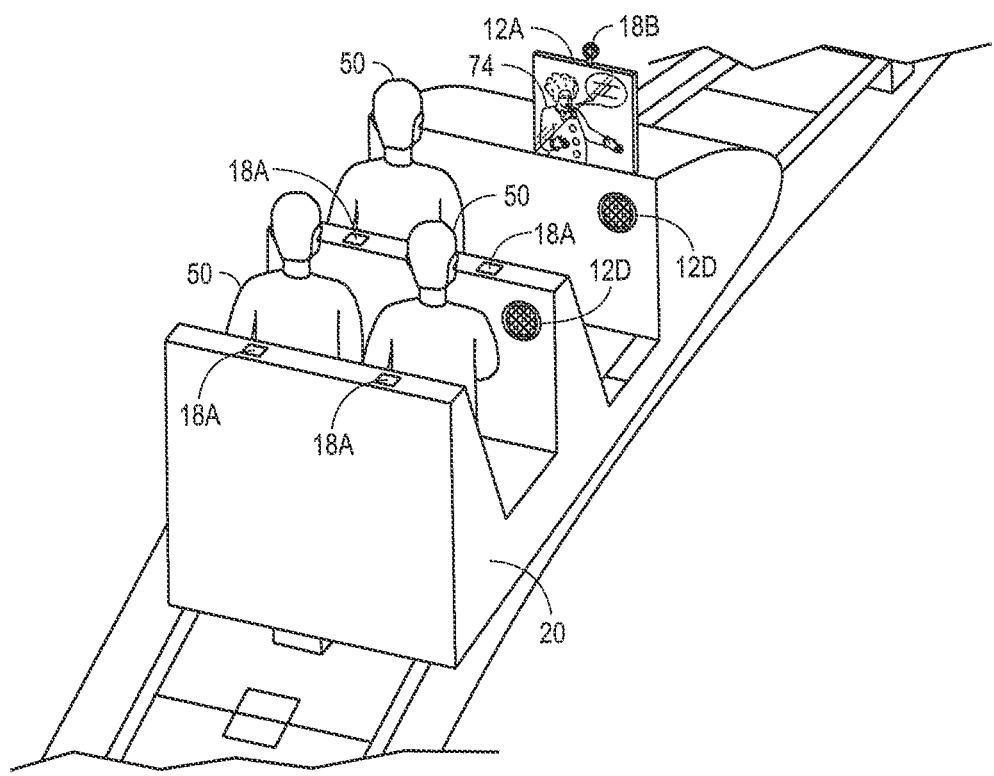
FIG. 5 illustrates a display via which a ride vehicle AI entity may be manifested, in accordance with an embodiment of the present disclosure.
Figure 6:
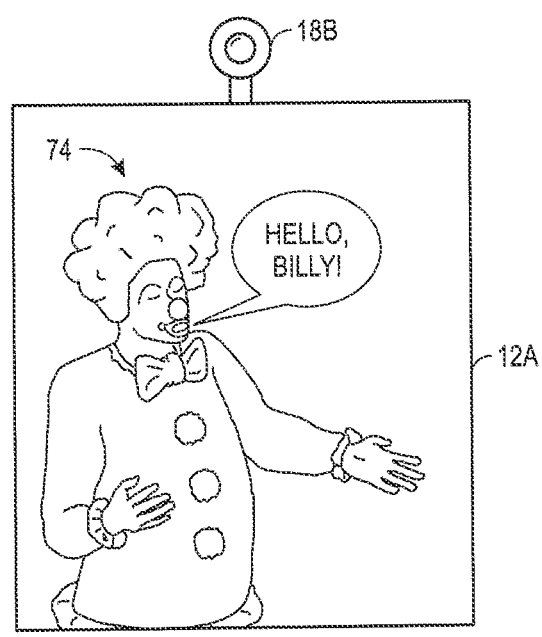
FIG. 6 illustrates the display and the sound effect system of the ride vehicle of FIG. 5 in more detail, in accordance with an embodiment of the present disclosure.

FIG. 5 illustrates a non-limiting example of how the ride vehicle AI entities described herein may be manifested as the guests 50 move around the amusement park 10. For example, FIG. 5 illustrates a display 12A of a ride vehicle 20 on which a character 74 relating to a ride vehicle AI entity 36 may be presented, and an associated sound effect system 12D of the ride vehicle 20 via which sounds may be generated to simulate the character 74 speaking. FIG. 6 illustrates the display 12A and the sound effect system 12D of the ride vehicle 20 of FIG. 5 in more detail. As described in greater detail herein, a particular ride vehicle AI entity 36 may manifest itself by taking control of one or more aspects of the character 74 presented via the display 12A (with associated sounds generated by the sound effect system 12D) when a guest 50 associated with the particular ride vehicle AI entity 36 is, for example, riding the ride vehicle 20 (e.g., as detected by one or more proximity sensors 18A and/or one or more cameras 18B of the ride vehicle 20) based on the properties of the particular ride vehicle AI entity 36 (see, e.g., FIG. 4). The one or more aspects that the ride vehicle AI entity 36 may take control of may include, but are not limiting, animations of the character 74, dialog of the character 74, special visual and/or audio effects related to the character 74, and so forth. For example, if the guest data for a particular guest 50 indicates that the particular guest 50 has a fear of (or, conversely, have an affinity for) the particular character 74, the character 74 may be caused by the AI entity management system 40 to speak in the general direction of the particular guest 50 in a relatively menacing manner (or, conversely, in a friendly manner).

While only certain features of the disclosure have been illustrated and described herein, many modifications and changes will occur to those skilled in the art. It is, therefore, to be understood that the appended claims are intended to cover all such modifications and changes as fall within the true spirit of the disclosure.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. § 112(f). However, for any claims containing elements designated in any other manner, it is intended that such elements are not to be interpreted under 35 U.S.C. § 112(f).

The invention claimed is:

1. A system for utilizing ride vehicle artificial intelligence entities, comprising:
   one or more guest activity recognition devices configured to recognize activity of one or more guests within a physical environment of an amusement park; and
   one or more ride vehicles of a ride of the amusement park, each ride vehicle comprising:

an artificial intelligence entity management system configured to maintain one or more ride vehicle artificial intelligence entities of the ride vehicle based at least in part on the recognized activity of the one or more guests; and one or more features disposed on the ride vehicle and configured to be activated by the artificial intelligence entity management system to simulate the existence of the one or more ride vehicle artificial intelligence entities in accordance with one or more properties of the one or more ride vehicle artificial intelligence entities.

2. The system of claim 1, wherein each ride vehicle artificial intelligence entity of the one or more ride vehicle artificial intelligence entities is specific to the ride vehicle.

3. The system of claim 1, wherein each ride vehicle artificial intelligence entity of the one or more ride vehicle artificial intelligence entities is specific to a guest or group of guests of the one or more guests.

4. The system of claim 1, wherein the one or more features disposed on the ride vehicle comprise one or more displays configured to be activated by the artificial intelligence entity management system to display a ride vehicle artificial intelligence entity of the one or more ride vehicle artificial intelligence entities.

5. The system of claim 1, wherein the one or more features disposed on the ride vehicle comprise a lighting effect system configured to be activated by the artificial intelligence entity management system to generate light associated with a ride vehicle artificial intelligence entity of the one or more ride vehicle artificial intelligence entities.

6. The system of claim 1, wherein the one or more features disposed on the ride vehicle comprise one or more animated figures configured to be activated by the artificial intelligence entity management system to simulate the existence of a ride vehicle artificial intelligence entity of the one or more ride vehicle artificial intelligence entities.

7. The system of claim 1, wherein the one or more features disposed on the ride vehicle comprise a sound effect system configured to be activated by the artificial intelligence entity management system to generate sound associated with a ride vehicle artificial intelligence entity of the one or more ride vehicle artificial intelligence entities.

8. The system of claim 1, wherein the one or more properties of the one or more ride vehicle artificial intelligence entities comprise an identity of the one or more ride vehicle artificial intelligence entities, one or more details about the one or more ride vehicle artificial intelligence entities, one or more personality traits of the one or more ride vehicle artificial intelligence entities, a mood of the one or more ride vehicle artificial intelligence entities, one or more preferences of the one or more ride vehicle artificial intelligence entities, or some combination thereof.

9. A method for utilizing ride vehicle artificial intelligence entities, comprising:

recognizing, via one or more guest activity recognition devices, activity of one or more guests within a physical environment of an amusement park;

maintaining, via an artificial intelligence entity management system of a ride vehicle, one or more ride vehicle artificial intelligence entities of the ride vehicle based at least in part on the recognized activity of the one or more guests; and activating, via the artificial intelligence entity management system of the ride vehicle, one or more features disposed on the ride vehicle to simulate the existence of the one or more ride vehicle artificial intelligence entities in accordance with one or more properties of the one or more ride vehicle artificial intelligence entities.

10. The method of claim 9, wherein each ride vehicle artificial intelligence entity of the one or more ride vehicle artificial intelligence entities is specific to the ride vehicle.

11. The method of claim 9, wherein each ride vehicle artificial intelligence entity of the one or more ride vehicle artificial intelligence entities is specific to a guest or group of guests of the one or more guests.

12. The method of claim 9, wherein activating the one or more features disposed on the ride vehicle comprises activating one or more displays to display a ride vehicle artificial intelligence entity of the one or more ride vehicle artificial intelligence entities.

13. The method of claim 9, wherein activating the one or more features disposed on the ride vehicle comprises activating a lighting effect system to generate light associated with a ride vehicle artificial intelligence entity of the one or more ride vehicle artificial intelligence entities.

14. The method of claim 9, wherein activating the one or more features disposed on the ride vehicle comprises activating one or more animated figures to simulate the existence of a ride vehicle artificial intelligence entity of the one or more ride vehicle artificial intelligence entities.

15. The method of claim 9, wherein activating the one or more features disposed on the ride vehicle comprises activating a sound effect system to generate sound associated with a ride vehicle artificial intelligence entity of the one or more ride vehicle artificial intelligence entities.

16. The method of claim 9, wherein the one or more properties of the one or more ride vehicle artificial intelligence entities comprise an identity of the one or more ride vehicle artificial intelligence entities, one or more details about the one or more ride vehicle artificial intelligence entities, one or more personality traits of the one or more ride vehicle artificial intelligence entities, a mood of the one or more ride vehicle artificial intelligence entities, one or more preferences of the one or more ride vehicle artificial intelligence entities, or some combination thereof.

17. A ride vehicle for utilizing ride vehicle artificial intelligence entities, wherein the ride vehicle is configured to:

receive data relating to recognized activity of one or more guests within a physical environment of an amusement park;

maintain one or more ride vehicle artificial intelligence entities of the ride vehicle based at least in part on the data relating to the recognized activity of the one or more guests; and activate one or more features disposed on the ride vehicle to simulate the existence of the one or more ride vehicle artificial intelligence entities in accordance with one or more properties of the one or more ride vehicle artificial intelligence entities.

18. The ride vehicle of claim 17, wherein each ride vehicle artificial intelligence entity of the one or more ride vehicle artificial intelligence entities is specific to the ride vehicle.

19. The ride vehicle of claim 17, wherein each ride vehicle artificial intelligence entity of the one or more ride vehicle artificial intelligence entities is specific to a guest or group of guests of the one or more guests.

20. The ride vehicle of claim 17, wherein the one or more properties of the one or more ride vehicle artificial intelligence entities comprise an identity of the one or more ride vehicle artificial intelligence entities, one or more details about the one or more ride vehicle artificial intelligence entities, one or more personality traits of the one or more ride vehicle artificial intelligence entities, a mood of the one or more ride vehicle artificial intelligence entities, one or more preferences of the one or more ride vehicle artificial intelligence entities, or some combination thereof.

* * * * *